(12) United States Patent
Christenson et al.

(10) Patent No.: US 8,256,465 B2
(45) Date of Patent: Sep. 4, 2012

(54) MICROFLUIDIC VALVE STRUCTURE

(75) Inventors: John C. Christenson, Kokomo, IN (US); Dan W. Chilcott, Greentown, IN (US)

(73) Assignee: Google Inc., Mountain View, CA (US)

( * ) Notice: Subject to any disclaimer, the term of this patent is extended or adjusted under 35 U.S.C. 154(b) by 1534 days.

(21) Appl. No.: 11/414,851

(22) Filed: May 1, 2006

(65) Prior Publication Data

US 2007/0251592 A1    Nov. 1, 2007

(51) Int. Cl.
*F16K 15/14* (2006.01)
*B81B 3/00* (2006.01)

(52) U.S. Cl. .................. 137/859; 137/517; 137/852

(58) Field of Classification Search ............ 137/512.15, 137/516.25, 519, 527.8, 532, 534, 625.11, 137/625.46, 625.47, 854, 858, 859, 517, 137/852
See application file for complete search history.

(56) References Cited

U.S. PATENT DOCUMENTS

| | | | | |
|---|---|---|---|---|
| 4,394,939 | A * | 7/1983 | Thor et al. | 137/854 |
| 5,413,599 | A * | 5/1995 | Imachi et al. | 623/1.24 |
| 6,240,962 | B1 * | 6/2001 | Tai et al. | 137/859 |
| 6,334,761 | B1 * | 1/2002 | Tai et al. | 417/413.3 |
| 6,428,713 | B1 | 8/2002 | Christenson et al. | |
| 6,715,733 | B2 * | 4/2004 | Wang et al. | 251/331 |
| 7,032,575 | B2 * | 4/2006 | Sims, Jr. | 123/509 |

* cited by examiner

*Primary Examiner* — John Rivell
(74) *Attorney, Agent, or Firm* — Shumaker & Sieffert, P.A.

(57) ABSTRACT

A microfluidic valve structure is provided. The valve structure includes a valve body having a fluid flow passage formed therein for allowing fluid to flow therethrough. A valve boss is configured to move relative to a valve seat to open and close the fluid flow passage. A plurality of flexible support arms extend between a wall of the valve body and the valve boss for supporting the valve boss relative to the valve body such that the valve boss engages and disengages the valve seat to close and open the passage.

28 Claims, 3 Drawing Sheets

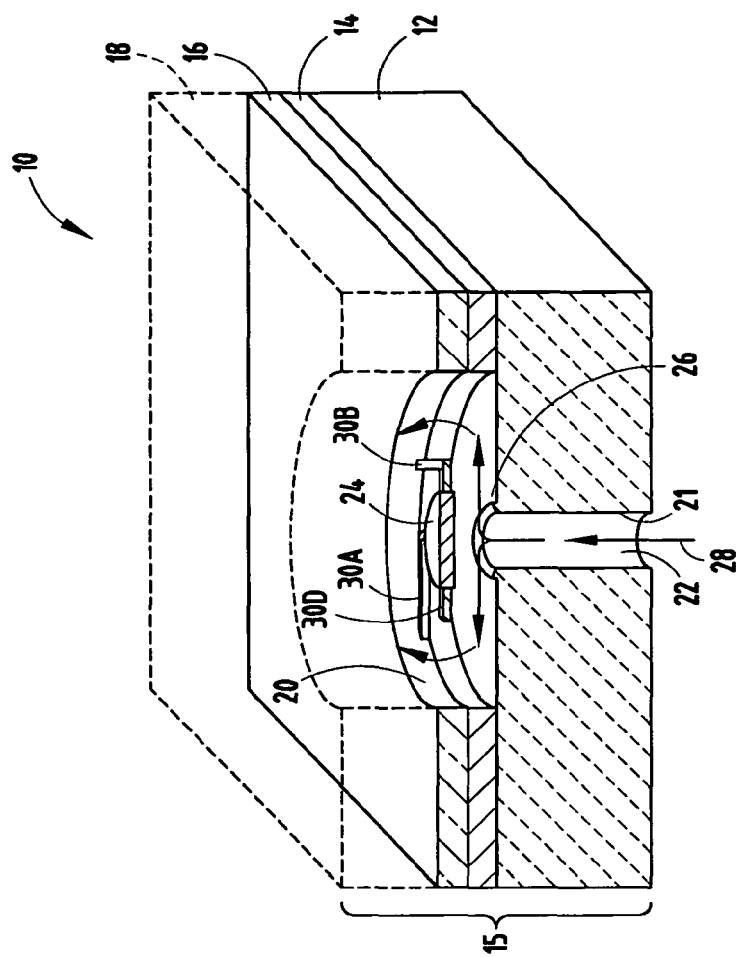
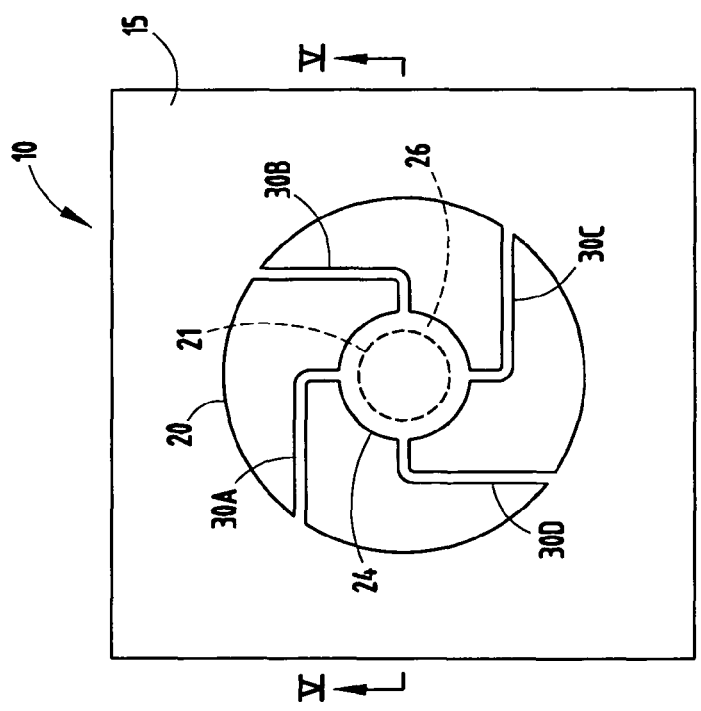
FIG. 5
FIG. 4

MICROFLUIDIC VALVE STRUCTURE

TECHNICAL FIELD

The present invention generally relates to valves for controlling fluid flow and, more particularly, relates to a microfluidic valve structure that may be formed on a micro-electromechanical system (MEMS) device.

BACKGROUND OF THE INVENTION

Microfluidic delivery devices are commercially available for delivering very small amounts of fluid. It is common for microfluidic delivery devices to employ one or more valves that may be formed on or within the device. Microfluidic valves can be made using micro-electro-mechanical systems (MEMS) manufacturing techniques to form a MEMS device. Such MEMS devices may include one or more valves and other features for controlling fluid flow. Microfluidic valves are used typically with a microfluidic pump and are useful for delivering drug fluids, such as insulin, and small quantities of other fluids.

One example of a conventional microfluidic valve structure 110 formed in a MEMS device is illustrated in FIGS. 1-3. The conventional microfluidic valve structure 110 is generally formed in a body having a substrate 112, such as a silicon substrate, using conventional MEMS fabrication processes. Essentially, one or more layers of silicon are etched away to form a fluid passage and valve components for controlling the flow of fluid through the passage. As seen, a passage 122 is formed extending through the valve body including substrate 112 and has an inlet 121 and an outlet 120. A valve boss 124 is suspended via three radial support arms 130A-130C adjacent to a valve seat 126. The valve boss 124 is positioned above the fluid passage 122 and is capable of moving up and out of contact with seat 126 and down and into contact with seat 126 therethrough to open and close the fluid passage 122 to allow fluid to flow in path 128 or prevent fluid flow. As shown in FIG. 2, fluid flows through microvalve structure 110 through passage 122 and around the valve boss 124 and exits outlet 120. The valve boss 124 shown is normally open to allow fluid to flow through the passage 122. When the fluid path is reversed, the valve boss 124 is forced into position against the seat 126 via back pressure to prevent fluid flow therethrough. Thus, the valve structure 110 operates as a one-way check valve.

Some valve bosses used in microfluidic devices are attached to the rim of a flow channel, shown here as outlet 120, by tethers or springs 130A, 130B and 130C that extend radially from the boss 124 as shown. Such valves may be displaced out of plane when the valve 110 is placed under stress, particularly if the stress on the valve is a compressive force F as shown in FIG. 3. Tensile stresses tend to increase the force needed to actuate the valve boss 124, and may also keep the valve boss 124 from properly closing. Under stress, the valve boss 124 may not seat properly upon the valve seat 126. This may lead to a leaky valve or inefficient device.

Many conventional valve designs employ three support arms (tethers) spaced at one hundred twenty degrees (120°) from each other extending radially from the valve boss to the wall of the outlet channel. These types of conventional valves may be prone to out-of-plane (cross-axis) movement under stress or when actuated. This may prevent a good seal between the valve boss and the seat, thereby resulting in a leaky valve and inefficient device.

It is therefore desirable to provide for a microfluidic valve structure that provides a good seal between the valve boss and the seat, to prevent leakage or inefficiency in the device. Additionally, it is desirable to provide for a valve structure that is generally immune to out-of-plane movement under stress or when otherwise actuated.

SUMMARY OF THE INVENTION

In accordance with the teachings of the present invention, a valve structure is provided. The valve structure includes a valve body and a fluid flow passage formed in the valve body for allowing fluid to flow therethrough. A valve seat is formed in the valve body surrounding the fluid flow passage. A valve boss is configured to open and close the fluid flow passage. A plurality of support arms including at least four support arms extend between a wall of the valve body and the valve boss for supporting the valve boss relative to the valve body. The plurality of support arms is flexible to allow the valve boss to engage and disengage the valve seat to close and open the fluid flow passage. According to a further aspect of the present invention, the valve is a microfluidic valve.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 4 is a top view of a microfluidic valve structure having support arms according to one embodiment of the present invention;

FIG. 5 is a perspective cross-sectional view of the microfluidic valve structure taken through line V-V of FIG. 4;

DESCRIPTION OF THE PREFERRED EMBODIMENTS

Figure 3:
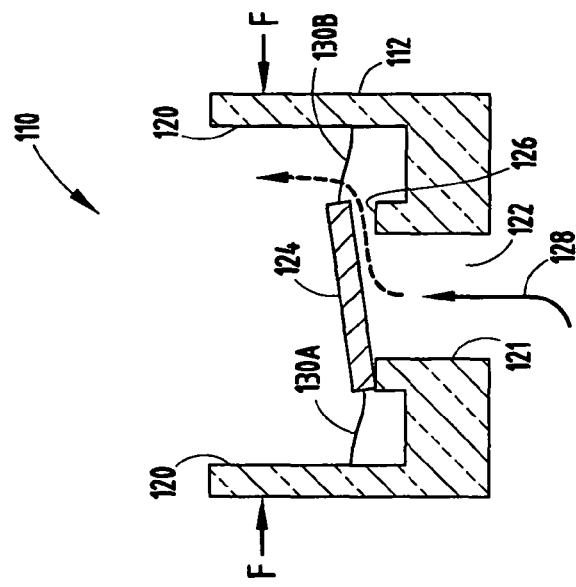
FIG. 3 is a cross-sectional view of the conventional valve structure taken through line II-II of FIG. 1 subject to compressive force F.
Figure 2:
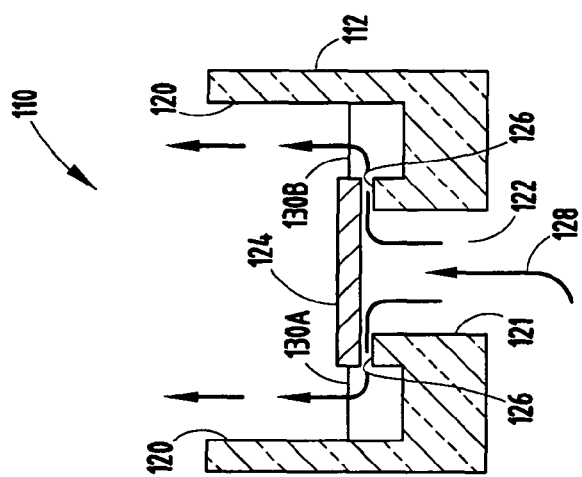
FIG. 2 is a cross-sectional view of the conventional valve structure taken through line II-II of FIG. 1.
Figure 1:
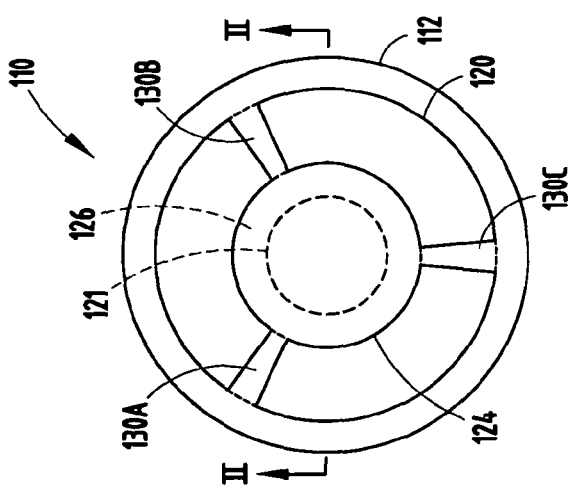
FIG. 1 is a top view of a conventional microfluidic valve structure.

Referring now to FIGS. 4 and 5, a microfluidic valve structure 10 is illustrated according to a first embodiment of the present invention for controlling the flow of fluid, such as liquid or gas. The microfluidic valve structure 10 is generally illustrated as a one-way check valve for controlling the flow of fluid through a fluid flow passage 22. The valve structure 10 is described in connection with a microfluidic structure formed on a MEMS device for controlling fluid in very small amounts. For example, the valve structure may be used to dispense or deliver a fluid drug, such as insulin, and can be manufactured according to a micro-electro-mechanical system (MEMS) fabrication technique. However, it should be appreciated that the teachings of the present invention may be applicable to other valve configurations, sizes and fabrication techniques and may be useful for various applications.

The valve structure 10 is shown fabricated on a silicon substrate 12, such as a single crystal silicon substrate, using a trench etching process, such as deep reactive ion etching (DRIE) and a bond etchback process. The fabrication process may include etching out a pattern from a doped material suspended over a cavity to form a pattern that is partially suspended over the cavity. One example of an etching process that may be used to form the valve structure 10 on a MEMS device is disclosed in commonly assigned U.S. Pat. No. 6,428,713, which is hereby incorporated herein by reference. While the valve structure 10, as described herein, is fabricated on a silicon substrate using a trench etching process, it should be appreciated that the valve structure 10 could be fabricated using other known fabrication techniques: such as an etch and undercut process; a deposition, pattern and etch process; and an etch and release process, without departing from the teachings of the present invention.

The valve structure 10 employs the support substrate 12, made of silicon according to one embodiment. Alternately, the support substrate 12 may be a glass or other material. Formed on top of the silicon substrate is an oxide layer 14. A device layer 16, which may include silicon of different doping levels, is formed on top of oxide layer 14. Overlying the device layer 16 is a top layer 18 that may be made of silicon or glass. If the top layer 18 is made of glass, the top layer 18 has transparent qualities that may enable viewing of the fluid. The valve structure 10 may be formed as a separate device or may be formed in combination with other devices, such as a pump or other valves, on a common supporting structure.

The substrate 12 and overlying layers 14-18 serve as a valve body 15 on which the fabricated valve device(s) are formed. A fluid flow passage 22 is formed extending through the substrate 12 and overlying layers 14-18 of the valve body 15. The fluid flow passage 22, in one embodiment, has a first diameter cylinder 21 forming the inlet which leads to a second larger diameter cylinder 20 forming the outlet. At the junction of the first and second diameter cylinders is a valve seat 26 that provides a seating surface essentially surrounding the first diameter cylinder 21 of fluid flow passage 22. The valve seat 26 has a flat surface extending from the first diameter cylinder 21 to the second diameter cylinder 20 and perpendicular to the cylindrical walls of the passage 22. Fluid is able to flow in path 28 through the fluid flow passage 22 and out the outlet 20, when the valve structure 10 is in the open position.

The valve structure 10 includes a valve boss 24 positioned to engage and disengage the valve seat 26 to close and open the fluid flow passage 22. The valve boss 24 is shown as a circular (disk-shaped) diaphragm suspended above the valve seat 26 in a normally open valve structure, according to one embodiment. In the normally open positioned, fluid is able to flow in path 28 into inlet 21, through the fluid flow passage 22, around valve boss 24 and exit the outlet 20. According to an alternate embodiment, the valve structure 10 may be configured as a normally closed valve in which the valve boss 24 normally rests on the valve seat 26 to block fluid flow through the fluid flow passage 22 when a sufficient pressure differential is not present.

The valve boss 24 is shown suspended above valve seat 26 by way of four support arms 30A-30D according to one embodiment. The four support arms 30A-30D are equi-angularly spaced ninety degrees (90°) apart from adjacent arms. The support arms 30A-30D extend from the interior wall of the valve body 15 defining the second diameter cylinder 20 to the periphery of the disk-shaped valve boss 24. The valve boss 24 and support arms 30A-30D are extensions of the device layer 16 that are etched to form the desired pattern. The support arms 30A-30D are flexible extensions of the device layer 16 that act as tethers to essentially suspend the valve boss 24 relative to the valve body. The support arms 30A-30D are sufficiently flexible to flex in a direction perpendicular to the longitudinal axis of the passage 22 to allow the boss 24 to move towards or away from seat 26.

The valve structure 10 advantageously employs at least four support arms. According to another embodiment, the valve structure 10 may employ eight support arms. The number of support arms may be greater than four. However, the number of support arms preferably is equal to $2^N$, wherein N is a whole integer equal to two or more. For example, the number of support arms may be 4, 8, 16, 32, etc. By employing $2^N$ support arms to support the valve boss 24, the valve boss 24 tends to stay in a level plane parallel to the valve seat 26, despite any applied stress to oppose any out of plane forces. The resulting support arm structure exhibits low sensitivity to cross-axis forces. Additionally, for a valve structure formed by a DRIE fabrication technique, the technique may etch better with a large number of supporting arms, as opposed to a smaller number of arms.

In the embodiment shown in FIGS. 4 and 5, the plurality of support arms 30A-30D are shown in a bent configuration, each generally having an approximate L-shape. The use of an approximate L-shape support arm allows the support arm tethers themselves to absorb planar deformation due to applied stresses. Thus, the valve structure 10 may be subjected to compressive or tensile forces, and the bent configuration of the support arms 30A-30D minimizes the effect on any deformation that gets transformed or translated to the valve boss 24. The support arms 30A-30D allow the valve boss 24 to move up and down in relation to the valve seat 26 to engage the valve seat 26 to close the fluid flow path, and to disengage the valve seat 26 to allow fluid to flow in path 28 into inlet 21, around the valve seat 26 and exit outlet 20. Thus, the plurality of support arms 30A-30D allow movement of the valve boss 26 in the vertical direction and further allow movement in valve boss 24 to minimize any cross-axis forces.

Figure 6:
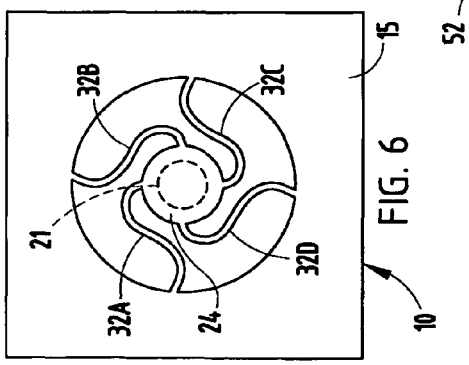
FIG. 6 is a top view of a microfluidic valve structure having support arms according to a second embodiment of the present invention.

Referring to FIG. 6, the valve structure 10 is shown having four support arms 32A-32D according to a second embodiment of the present invention. The support arms 32A-32D are shown likewise extending from the device layer 16 at inner wall 20 of the valve body 15 to the periphery of the valve boss 24. Each of the support arms 32A-32D is formed as an approximate S-shaped curve. The approximate S-shaped curve support arms 32A-32D likewise resists forces that are applied in the cross-axis or in the plane of the valve boss 24, and yet allow for movement of the valve boss 24 to engage and disengage valve seat 26.

Figure 7:
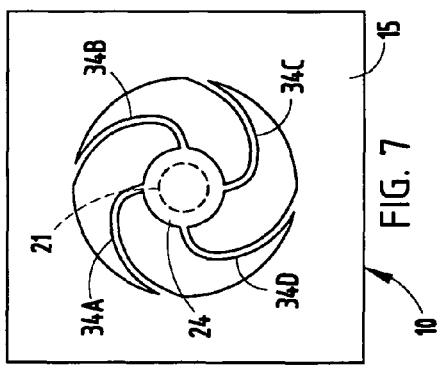
FIG. 7 is a top view of a microfluidic valve structure having support arms according to a third embodiment of the present invention.

Referring to FIG. 7, the valve structure 10 is illustrated employing four approximate C-curved support arms 34A-34D according to a third embodiment of the present invention. The approximate C-curved support arms 34A-34D are each configured in a general spiral configuration. Each of the approximate C-curved support arms 34A-34D likewise minimizes cross-axis forces and allows for movement of the valve boss 24 to engage and disengage the valve seat 26.

Figure 8:
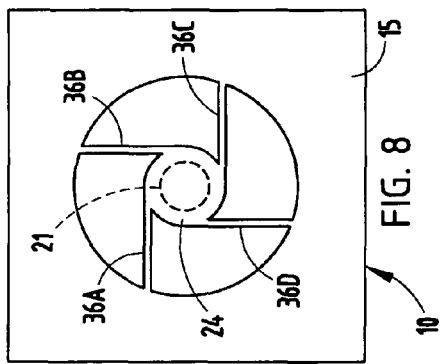
FIG. 8 is a top view of a microfluidic valve structure having support arms according to a fourth embodiment of the present invention.

Referring to FIG. 8, the valve structure 10 is illustrated employing four generally straight support arms 36A-36D according to a fourth embodiment of the present invention. Each of the support arms 36A-36D extends from device layer 16 at inner wall 20 of the valve body 15 to the periphery of the valve boss 24 at a tangent. The tangential attachment of support arms 36A-36D to valve boss 24 allows for minor in-plane rotation of the valve boss 24 in lieu of out-of-plane displacement.

Figure 9:
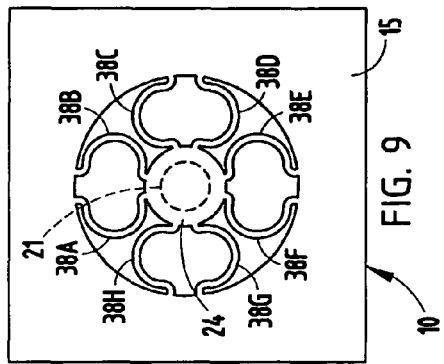
FIG. 9 is a top view of a microfluidic valve structure having support arms according to a fifth embodiment of the present invention.

Referring to FIG. 9, the valve structure 10 is further illustrated having eight support arms 38A-38H according to a fifth embodiment of the present invention. The support arms 38A-38H are configured as four pairs of approximate C-shaped support arms. The support arms 38A-38H are each generally formed in an approximate C-shape configuration supported at the periphery of the valve boss 24 and extended from device layer 16 at the interior wall 20 of the valve body 15. The support arms 38A-38H allow for movement of the valve boss 24 vertically to engage and disengage the valve seat 26, however, rotation and linear movement of the valve boss 24 may be more restricted as compared to other embodiments.

Accordingly, the various configurations of the flexible support arms illustrated in FIGS. 4-9 offer various advantages including absorbing forces to maintain planar horizontal orientation of the valve boss with respect to the valve seat despite the presence of applied stresses. Thus, the support arms mitigate multiple-axis flexure of the support arms. The curved tether arms are designed to be properly compliant within the X-Y plane to deform under stress, thereby allowing the valve boss 24 to move in-plane. This prevents or minimizes problems with the valve boss 24 not seating against the valve seat 26 properly, thus preventing leaky valves and/or inefficient device(s). The support arms advantageously minimize the adverse effects of compressive and tensile stresses that can influence the behavior of the valve structure 10.

The valve structure 10 may be fabricated using known MEMS fabrication techniques. One example of a fabrication process for manufacturing the valve structure 10 is as follows.

A first silicon substrate having a 2 µm thick layer of oxide formed upon it is patterned, as is known in the art, and a circular hole is etched through the oxide layer. The etch may be any type known, wet or dry. The pattern layer is then stripped, and the first substrate is set aside.

Next, a second silicon substrate referred to as the handle wafer is prepared. An etch stop layer such as a heavily doped P++ layer is formed on the top surface of the handle wafer, and then an epitaxial silicon layer (epi) is grown upon the etch stop layer. The epi layer may be of any desired thickness, such as 15-40 µm thick.

Then, the patterned oxide surface of the first substrate and the epi layer surface of the handle wafer are bonded together. The bond may include silicon direct bond, frit bond, adhesives, glues, etc., such that the epi layer covers the patterned area in the oxide layer. A protective layer, such as an oxide, is then formed on all the surfaces of the bonded wafer stack.

Once the two substrates are bonded together, the protective layer is removed from the substrate of the handle wafer. This may be achieved using a wet etch. The substrate portion of the handle wafer is then removed, such as by wet etching. The substrate etch is selective, and the etch will stop on the etch stop layer. Any selective silicon etch, as is known in the art, may be used to remove the silicon substrate, including wet etchants such as KOH. This leaves the etch stop layer and the epi layer bonded to the first substrate.

The etch stop layer may be left upon the epi layer according to one embodiment. Together, the etch stop layer and the epi layer form the device layer 16 of the valve structure 10. The device layer 16 is then patterned and partially etched to thin the portion of the device layer that will be made into the valve boss 24 and the legs that support the boss and connect it to the body of the valve, as well as the valve outlet port. The remaining device layer thickness may range from 5-30 µm. A second pattern and etch step that forms the valve boss and the valve legs, and completes the valve outlet port. These device layer etch steps may include both wet and dry etches, however, a deep reactive ion etch may be preferred.

A third substrate 18, such as glass is then bonded to the device layer 16 surface of the valve structure as is known in the art. Finally, the first substrate 12 is patterned and a hole is formed through the substrate to form the inlet port for the valve structure to complete the fabrication. The hole in the substrate may be dry etched, although several methods including wet etches, dry etches and laser drilling may be employed.

Figure 10:
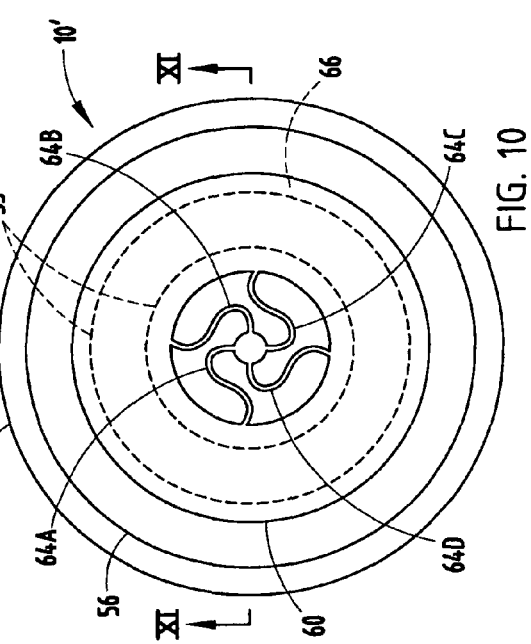
FIG. 10 is a top view of a microfluidic valve structure having a ring-shaped valve boss according to another embodiment of the present invention.
Figure 11:
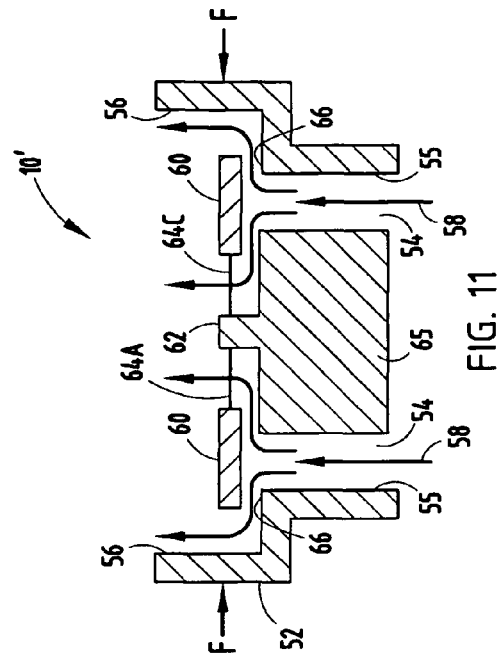
FIG. 11 is a cross-sectional view taken through line XI-XI of FIG. 10.

Referring to FIGS. 10 and 11, a valve structure 10' is illustrated employing a ring-shaped valve boss 60, according to another embodiment of the present invention. In this embodiment, a ring-shaped fluid flow passage 54 is provided having an inlet 55 and a larger diameter outlet 56. The ring-shaped valve boss 60 is supported on the inside to a central pedestal 62 which is an extension of the supporting substrate 65 of the valve body. Thus, the ring-shaped valve boss 60 is suspended on the inside from central pedestal 62 via a plurality of support arms 64A-64D. The annular ring-shaped valve boss 60 suspended from the inside may be less prone to stress applied to the valve structure 10'. It should be appreciated that the S-shaped support arms 64A-64D may be employed or other shaped support arms, such as those described above, could be employed to support the ring-shaped valve boss 60. Additionally, it should be appreciated that more than four support arms may be employed to support the ring-shaped valve boss 60.

The ring-shaped valve boss 60 is shown in a normally open position suspended above the valve seat 66 such that fluid is able to flow in path 58 around valve boss 60 and exit outlet 56. With attempted flow in the reverse direction, the back pressure created by the reverse flow forces the valve boss 60 to engage valve seat 66 to close off the fluid flow passage 54 and prevent fluid flow therethrough. It should be appreciated that while a normally open valve structure 10' is illustrated, the valve structure 10' may be configured in a normally closed configuration, such that the valve boss 60 is forced away from valve seat 66 when fluid pressure, such as due to a fluid pump, is greater at the inlet as opposed to the outlet. It should further be appreciated that valve structure 10' may be fabricated similar to the fabrication technique described above to make valve structure 10.

Accordingly, the valve structure 10 or 10' of the present invention advantageously provides for the control of fluids, such as very small amounts of fluid to be dispensed in a device. The structure is less sensitive to cross-sensed axis and compressive and tensile forces that may be applied to the device. The microfluidic valve structure 10 or 10' may be formed on a MEMS device with or without other devices supported on a common substrate. The microfluidic valve structure 10 or 10' is particularly useful for applications that require the dispensing of small amounts of fluid, such as the dispensing of drugs (e.g., insulin). However, it should be appreciated that any of a number of fluids, including liquids or gases, may be controlled with the valve structure 10 or 10' of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A valve structure comprising:
   a valve body;
   a fluid flow passage formed in the valve body for allowing fluid to flow therethrough, said passage having an inlet and an outlet;
   a valve seat formed in the valve body surrounding the fluid flow passage;
   a valve boss positioned to engage and disengage the valve seat to close and open the fluid flow passage; and
   a plurality of support arms comprising greater than four support arms extending between a wall of the valve body and the valve boss for supporting the valve boss relative to the valve body, wherein the plurality of support arms comprises $2^N$ support tethers, where N is a whole integer, wherein the plurality of support arms are flexible to allow the valve boss to engage and disengage the valve seat to close and open the fluid flow passage, and wherein the valve boss and the plurality of support arms comprise silicon.

2. The valve structure as defined in claim 1, wherein the valve boss and the plurality of support arms are etched from a layer of silicon.

3. The valve structure as defined in claim 1, wherein each of the plurality of support arms is bent to mitigate multiple-axis flexure of the support arms.

4. The valve structure as defined in claim 3, wherein each of the plurality of bent support arms comprises an approximate L-shape arm.

5. The valve structure as defined in claim 3, wherein each of the plurality of support arms comprise a curved shape arm.

6. The valve structure as defined in claim 5, wherein each of the plurality of curved arms comprise an approximate C-shape arm.

7. The valve structure as defined in claim 5, wherein each curved arm comprises an approximate S-shape arm.

8. The valve structure as defined in claim 5, wherein each of the plurality of support arms comprises a spiral shape arm.

9. The valve structure as defined in claim 1, wherein each of the plurality of support arms extends to a periphery of the valve boss at a tangent.

10. The valve structure as defined in claim 1, wherein the plurality of support arms are equi-angularly located.

11. The valve structure as defined in claim 1, wherein the valve body comprises a silicon substrate.

12. The valve structure as defined in claim 1, wherein the valve body comprises a glass substrate.

13. The valve structure as defined in claim 1, wherein the valve structure is formed on a micro-electro-mechanical system (MEMS) device.

14. The valve structure as defined in claim 1, wherein the valve boss comprises a circular diaphragm.

15. The valve structure as defined in claim 1, wherein the valve boss comprises an annular ring-shaped boss.

16. The valve structure as defined in claim 15, wherein the annular ring-shaped boss is connected to the valve body at a central pedestal and the plurality of support arms extend from the central pedestal to the annular ring-shaped boss.

17. The valve structure as defined in claim 1, wherein the fluid flow passage comprises a first cylindrical passage having a first diameter and a second cylindrical passage having a second larger diameter, wherein the valve seat is formed by a surface connecting the first and second cylindrical passages.

18. A microfluidic valve structure for controlling flow of fluid, said valve structure comprising:
    a valve body comprising a substrate and a patterned device layer;
    a fluid flow passage formed in the valve body for allowing fluid to flow therethrough, said passage having an inlet and an outlet;
    a valve seat formed in the valve body and surrounding the fluid flow passage;
    a valve boss formed in the device layer and positioned to engage and disengage the valve seat to close and open the fluid flow passage; and
    a plurality of support arms formed in the device layer and comprising greater than four support arms extending between a wall of the valve body and the valve boss for supporting the valve boss relative to the valve body, wherein the plurality of support arms comprises $2^N$ support tethers, where N is a whole integer, wherein the plurality of support arms are flexible to allow the valve boss to engage and disengage the valve seat to close and open the fluid flow passage, and wherein the valve boss and the plurality of support arms comprise silicon.

19. The valve structure as defined in claim 18, wherein the fluid flow passage comprises a first cylindrical passage having a first diameter and a second cylindrical passage having a second larger diameter, wherein the valve seat is formed by a surface connecting the first and second cylindrical passages.

20. The valve structure as defined in claim 18, wherein the valve boss and the plurality of support arms are etched from a layer of silicon.

21. The valve structure as defined in claim 18, wherein each of the plurality of support arms is bent to mitigate multiple-axis flexure of the support arms.

22. The valve structure as defined in claim 18, wherein each of the plurality of support arms extends to a periphery of the valve boss at a tangent.

23. The valve structure as defined in claim 18, wherein the substrate comprises silicon.

24. The valve structure as defined in claim 18, wherein the substrate comprises glass.

25. The valve structure as defined in claim 18, wherein the valve structure is formed on a micro-electro-mechanical system (MEMS) device.

26. The valve structure as defined in claim 18, wherein the valve boss comprises a circular diaphragm.

27. The valve structure as defined in claim 18, wherein the valve boss comprises an annular ring-shaped boss.

28. The valve structure as defined in claim 27, wherein the annular ring-shaped boss is connected to the valve body at a central pedestal and the plurality of support arms extend from the central pedestal to the annular ring-shaped boss.

* * * * *